(12) United States Patent
Rogers et al.

(10) Patent No.: US 7,781,746 B1
(45) Date of Patent: Aug. 24, 2010

(54) SCANNER TRANSPORT CARRIER FOR FLEXIBLE PHOSPHOR SHEET

(75) Inventors: Michael K. Rogers, Mendon, NY (US); Anthony Dirisio, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 43 days.

(21) Appl. No.: 12/412,432

(22) Filed: Mar. 27, 2009

(51) Int. Cl.
*G03B 42/08* (2006.01)

(52) U.S. Cl. .................. 250/484.4; 250/584; 250/588; 250/589

(58) Field of Classification Search .............. 250/483.1, 250/484.4, 584, 585, 588, 589
See application file for complete search history.

(56) References Cited

U.S. PATENT DOCUMENTS

| | | | |
|---|---|---|---|
| 4,357,539 A | 11/1982 | Fleer et al. | |
| 4,827,136 A | 5/1989 | Bishop, Jr. et al. | |
| 5,285,237 A | 2/1994 | Parulski et al. | |
| 5,310,059 A | 5/1994 | Robertson | |
| 5,712,486 A * | 1/1998 | Soltani et al. | 250/484.4 |
| 2007/0139732 A1 | 6/2007 | Ohta et al. | |

FOREIGN PATENT DOCUMENTS

WO    WO 97/38917    10/1997

* cited by examiner

*Primary Examiner*—David P Porta
*Assistant Examiner*—Mark R Gaworecki

(57) ABSTRACT

A carrier for transporting a section of flexible phosphor imaging medium through a scanner has a flexible support having a front surface and a back surface, at least one releasable retaining element coupled to the flexible support for holding a first surface of the section of flexible phosphor imaging medium against the front surface of the flexible support, and a flexible frame extending at least partially along the perimeter of the flexible support and having a thickness above the front surface of the flexible support that is substantially the same as the thickness of the section of flexible phosphor imaging medium that is held against the front surface.

16 Claims, 5 Drawing Sheets

US 7,781,746 B1

SCANNER TRANSPORT CARRIER FOR FLEXIBLE PHOSPHOR SHEET

FIELD OF THE INVENTION

The invention relates generally to Computed Radiography imaging, and more particularly to apparatus and methods for scanning flexible Computed Radiography media in order to obtain the stored image therefrom.

BACKGROUND OF THE INVENTION

Computed Radiography (CR) imaging systems form images by directing X-rays through a subject and onto a photostimulable phosphor storage medium. To obtain the image stored thereon, the stimulable phosphor storage medium is then processed by a scanner that scans a laser beam or other light source across the surface of the storage medium, releasing the stored charge for each pixel (picture element) of the image. The charge that is thus obtained is indicative of the image that was originally stored from X-ray radiation. Advantageously, the stimulable phosphor medium can be repeatedly erased and re-used.

In conventional CR systems, designed to be compatible with the film-based model of earlier X-ray imaging apparatus, the photostimulable phosphor storage medium is a plate or flexible sheet that is stored within a cassette. The cassette allows the phosphor sheet to be placed into position, imaged, and processed without the need for an operator or technologist to touch and possibly degrade the storage medium. The scanner then extracts the phosphor plate or sheet from the protective cassette, scans the sheet by transporting it across a scan head that contains the scanning light source used for photostimulation, and restores the phosphor storage medium to its cassette.

In the conventional scanning paradigm, the image scanning device is typically designed for the specific characteristics of the type of stimulable phosphor storage medium that is used. Thus, for example, a scanner may be designed to handle phosphor plates of given dimensions and other physical characteristics and is typically able to process only those plates packaged in a specific cassette configuration. Similarly, a scanner for flexible media requires that the scanned phosphor sheet at least have a standard width, or a width that is compatible with its transport drive system. This standard approach is satisfactory for some types of systems. However, restricting media dimensions to a certain specific size or range of sizes presents a limitation for some types of imaging. In particular, non-destructive testing (NDT) applications benefit by imaging onto sections of flexible phosphor sheet that can be inserted into an orifice or wrapped about a weld or other structure. The sections of imaging medium that are needed for such applications may be cut to irregular size or may be too small for processing in a conventional scanner having a sheet transport apparatus.

Because of these limitations of scanner transport, the conventional solution for imaging using odd-sized sections of flexible photostimulable storage media uses a flatbed scanner. An oddly shaped or smaller sized section of a phosphor imaging medium can be simply laid flat against the platen of the flatbed scanner and pressed beneath the scanner cover for obtaining the image. While this presents a workable solution, however, the need to procure, store, and use a separate flatbed scanning device for NDT imaging adds to the cost, complexity, and space required for such systems. In many cases, the scanner platen height and width dimensions may far exceed those of the scanned medium.

Thus, it can be seen that there is a need for a mechanism that allows flexible phosphor storage medium to be transported through a sheet-fed scanner.

SUMMARY OF THE INVENTION

An object of the present invention is to advance the art of scanning flexible phosphor imaging media. With this object in mind, embodiments of the present invention provide a carrier for transporting a section of flexible phosphor imaging medium through a scanner comprising: a flexible support having a front surface and a back surface; at least one releasable retaining element coupled to the flexible support for holding a first surface of the section of flexible phosphor imaging medium against the front surface of the flexible support; and a flexible frame extending at least partially along the perimeter of the flexible support and having a thickness above the front surface of the flexible support that is substantially the same as the thickness of the section of flexible phosphor imaging medium that is held against the front surface.

Embodiments of the present invention enable the scanning of odd-sized sections of flexible phosphor imaging media, such as might be required for various types of diagnostic and non-destructive test applications.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
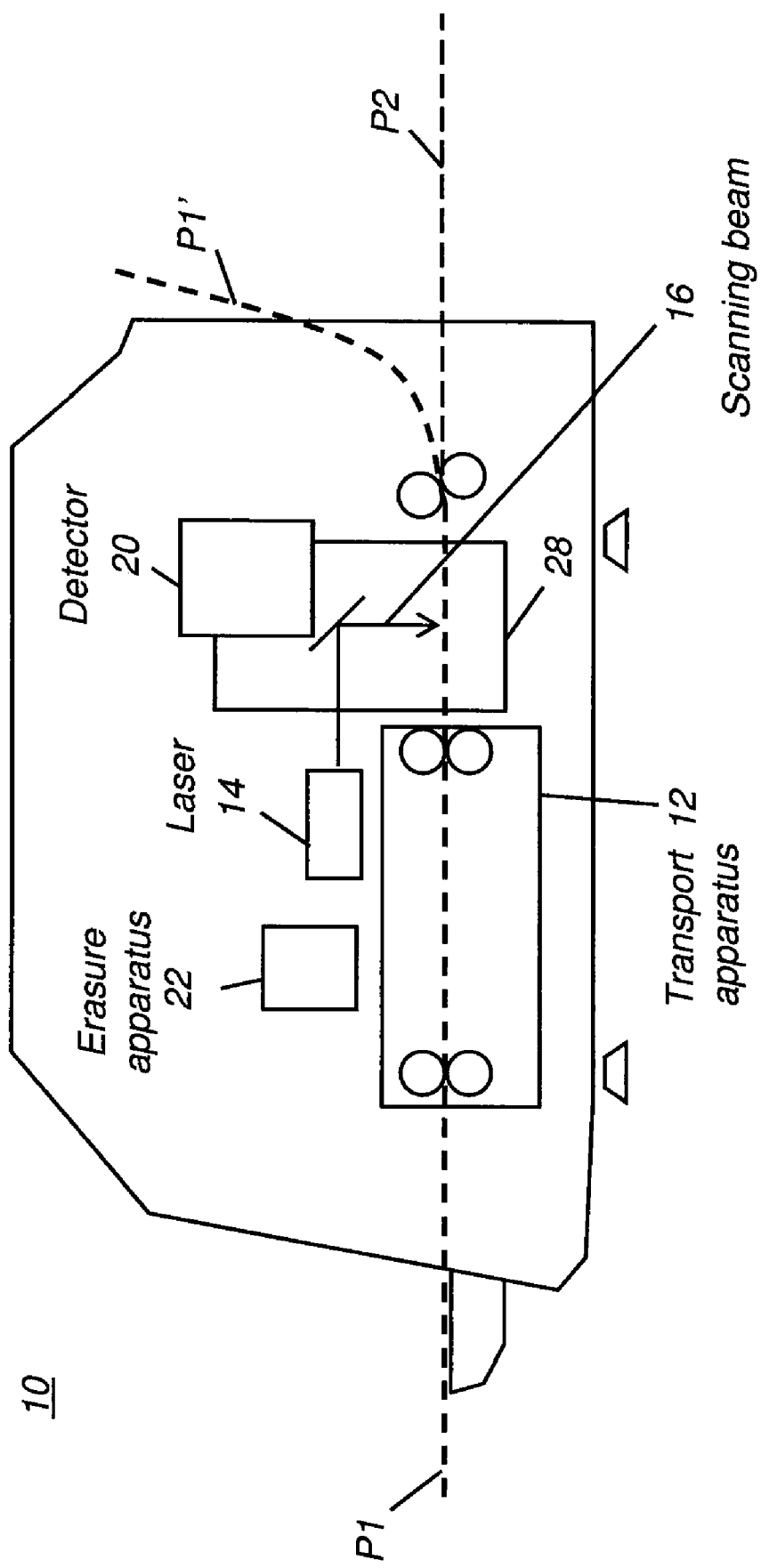
FIG. 1 shows a block diagram of a scanner for flexible phosphor imaging media, showing media transport paths.

The following is a detailed description of the preferred embodiments of the invention, reference being made to the drawings in which the same reference numerals identify the same elements of structure in each of the several figures.

The relative rigidity or stiffness of a sheet material is formally characterized as proportional to the product of its elastic modulus E and the cubed value of the sheet thickness t, that is, $Et^3$. In practice, the relative rigidity or stiffness of a sheet material relates to the amount of deflection of a structure or sheet material per an applied unit force. A rigid structure would have a small deflection per unit force compared to a flexible structure that would have a larger deflection per the same unit force. Since all sheet materials tend to exhibit some amount of flexibility, the threshold for distinguishing a "rigid" from a "flexible" sheet is defined according to the application for which the sheet is used. Relative to the present disclosure, a sheet or carrier would be considered flexible if the proportional relationship between its Modulus of Elasticity (E), Moment of Inertia (I), Length (L), and Section Modulus (Z) were such that the sheet or carrier conforms, without damage, to the curvature of a curved transport path in a scanner that is designed for scanning flexible phosphor x-ray imaging media. As an exemplary guideline, a sheet that would be considered to be flexible or substantially flexible in the context of the present disclosure would have rigidity that does not exceed that of a sheet of polyethylene, with a modulus of elasticity (E) 180,000 psi, a length (L) of 17 inches, a width (w) of 14 inches, and a thickness (t) of about t=0.06 inches. A curved transport path would have its minimum radius of curvature determined by its sheet-guiding components. For the present disclosure, a radius of curvature for a curved transport path in a conventional flexible sheet scanner would be well within 1 meter (39.37 inches).

As noted in the background section, NDT and other imaging applications take advantage of the relative flexibility of flexible phosphor imaging media, such as that used with the KODAK INDUSTREX Digital Systems, for example. Using systems of this type, a user can cut out a suitably-shaped portion of the flexible medium from a larger sheet, then wrap or insert the cut portion around or within the object to be imaged. Once this has been done, however, the cut portion of the flexible media could previously be scanned only by using a flat platen scanner; an odd-sized portion of a sheet typically cannot be directly fed into a sheet-transport scanner that uses a curved transport path, as noted earlier in the background section.

The block diagram of FIG. 1 shows a simplified side-view schematic of a sheet scanner 10 that is capable of scanning flexible phosphor imaging media. The basic media transport path is shown as the bold dashed line labeled P1, with its curved exit portion of the transport path shown as P1'. An alternate, straight-through feed transport path that might also be used is shown as P2. Using scanner 10 as shown in FIG. 1, a sheet of flexible phosphor imaging media is transported from left to right. A transport apparatus 12 accepts the sheet and feeds it forward for scanning at a scanning head 28 by a scanning beam 16, typically having a laser 14 as its source. Transport apparatus 12 uses paired rollers or other suitable devices for gripping and moving the flexible medium through the scanner. A detector 20, such as a photomultiplier tube (PMT) is disposed to collect stimulated light from the scanned surface of the phosphor medium in order to obtain the stored image. An optional erasure apparatus 22 may be provided at a suitable point along the transport path. In the embodiment of FIG. 1, the scanned sheet medium is optionally fed backwards after completion of scanning, in order to provide the erasure function before it is ejected. Optionally, an erasure apparatus 22 could be placed further along the transport path so that this function is performed after scanning, without requiring reversal of direction for sheet transport.

A number of commercially available scanners use the overall arrangement shown in FIG. 1, providing sheet transport components and using a transport path that is curved within the device as shown at P1-P1'. Design and operational characteristics of conventional sheet scanners 10 generally prevent odd-sized sections of flexible phosphor imaging media from being usable with these devices, particularly when the media is of small size. For example, a section of flexible phosphor imaging medium may be too narrow for handling by paired roller transport or other sheet transport components. A jam or misfeed could easily occur if the section of media is too small or is of irregular shape. The use of a curved transport or exit path (shown at P1' in FIG. 1) may further constrain the usability of a custom-sized section of this imaging media. That is, even if a shorter section of flexible phosphor imaging media can be scanned, it may not be possible to reliably feed the odd-sized section of material through the scanner and to an output slot or tray.

The apparatus and methods of the present invention address the size incompatibility problem by providing a flexible carrier for retaining one or more variably sized and shaped sections of flexible phosphor imaging media. The carrier that is provided can then be processed within the flexible sheet scanner, obviating the need to use a separate platen-based scanner, as noted earlier.

Figure 2:
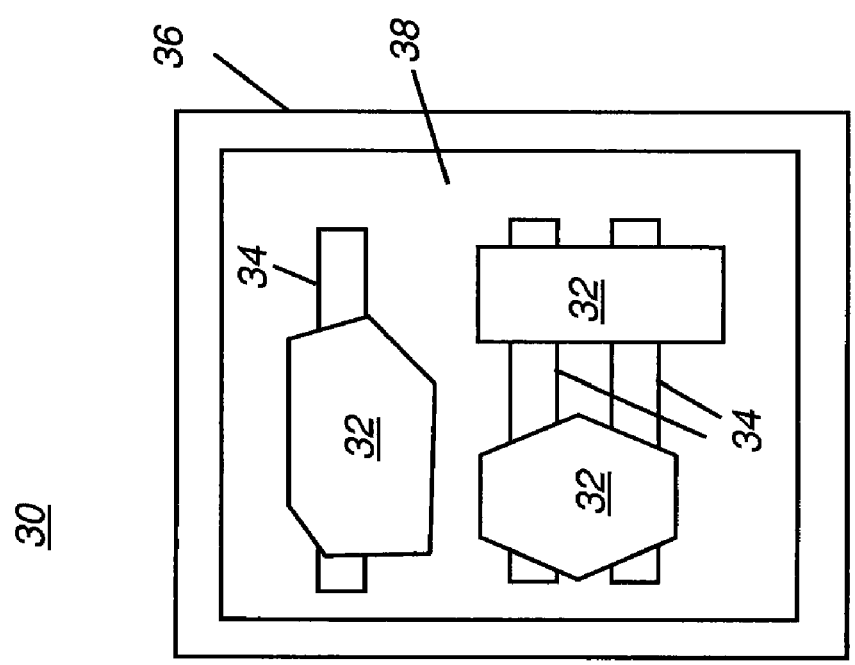
FIG. 2 shows a plan view of a carrier for flexible media in one embodiment.

The plan view of FIG. 2 shows a carrier 30 for transporting one or more sections 32 of flexible phosphor imaging media through a sheet-fed scanner according to one embodiment of the present invention. Three sections 32 of the phosphor imaging medium are shown with their back, non-phosphor-bearing surfaces held against a front surface 40 of a flexible support 38 by one or more releasable retaining elements 34 that are themselves coupled to flexible support 38. An optional flexible frame 36 extends at least partially along the perimeter of support 38. Flexible frame 36 may be attached along front surface 40. In an alternate embodiment, frame 36 can extend along both front surface 40 and a back surface 42. As shown in FIG. 2, sections 32 can have any suitable shape or dimensions, provided that they fit within frame 36 and can be held in place against front surface 40 of flexible support 38 by releasable retaining elements 34.

Figure 3:
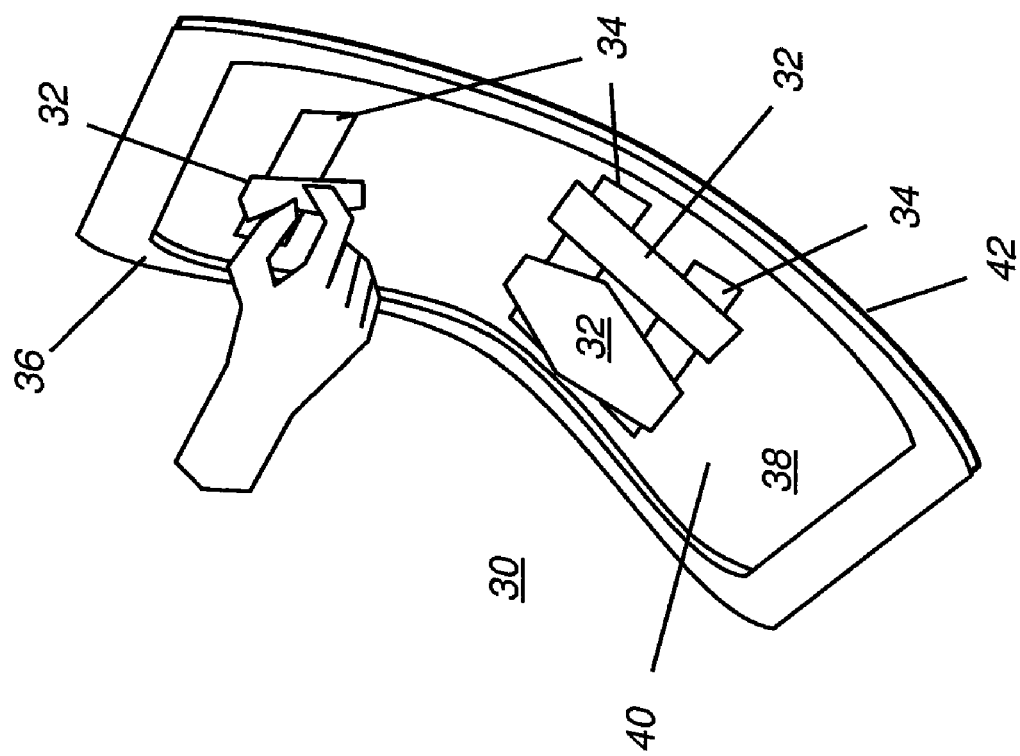
FIG. 3 shows a perspective view of a carrier showing removal/repositioning of section of flexible phosphor media.

FIG. 3 shows a perspective view of carrier 30 and shows one section 32 of flexible phosphor imaging media being applied onto or removed from releasable retaining element 34. Releasable retaining element 34 can be any of a number of types of element coupled to support 38 for retaining sections 32 against front surface 40 of support 38. The releasable aspect of releasable retaining element 34 allows repositioning and removal of sections 32 for re-use, without causing damage to the imaging material that is coated on its imaging surface.

Embodiments of retaining element 34 that more closely conform to the thickness, flexibility, and surface characteristics of the flexible phosphor medium are preferred. It is advantageous to maintain a high percentage of surface-to-surface contact between the non-phosphor surface of section 32 and front surface 40 throughout the transport path, particularly where curved, without distortion or undesirable stretching of the phosphor surface. In one embodiment, retaining element 34 is a double-sided, reduced-tack adhesive tape designed to be releasable, such as "leader tape" known in the film-splicing arts. A suitable releasable adhesive tape would generally have an adhesive with tensile strength, on the side that retains the non-imaging surface of the phosphor imaging medium, in the range of about 50 psi or below. This tape, in a double-sided form, can be applied directly to front surface 40 of flexible support 38 or may be applied to the back (non-phosphor) surface of sections 32. This arrangement allows a length of tape to be used for one or more scans, and then replaced by a fresh portion of the tape. In another embodiment, areas having an applied adhesive, or an adhesive element, in a randomized or in a regular pattern, allow retention of a section 32 of media in proper position, suitable for scanning. A commercially available semi-tacky adhesive web or spray-mount adhesive could also be used, applied either to the back surface of section 32 or, alternately, to the surface of support 38.

Figure 4:
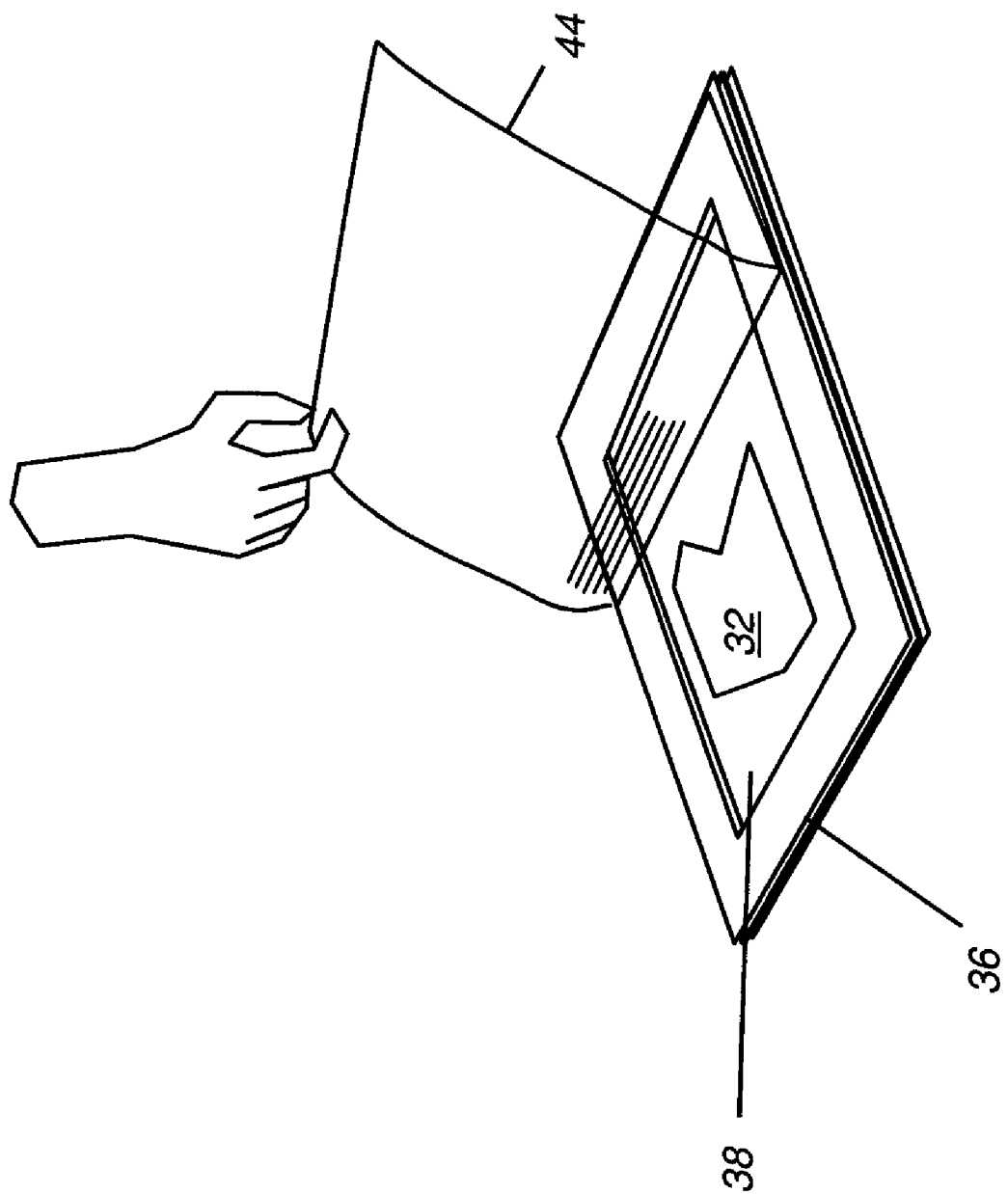
FIG. 4 shows the use of a cover sheet that, as one type of retaining element, covers at least a portion of the flexible phosphor imaging material.

In addition to adhesion, a number of other types of low-profile retention can be provided by releasable retaining element 34. For example, suction can be provided, such as by using numerous small suction cups formed onto the surface of releasable retaining element 34 or formed directly on support 38. Still other embodiments use miniature hook-and-loop fasteners (such as VELCRO fasteners from Velcro USA Inc, Manchester, N.H.) or other elements that can be flexibly applied to the surface of support 38 as needed and that allow the release of any section 32 without damage following scanning. The alternate embodiment of FIG. 4 shows the use of a cover sheet 44 that covers at least a portion of the flexible phosphor imaging material as an overlay. Cover sheet 44 would be a material that has minimum reflection of scanning beam 16 (FIG. 1) and that does not cause spreading or refraction of stimulated light from the phosphor medium. For transport through scanner 10 (FIG. 1) or similar scanning apparatus, it is noted that the assembled carrier package, such as that shown in FIGS. 2 and 3, travel through the transport path, particularly through a curved transport path, and be retained as a unit, holding all of sections 32 in place against the surface until scanning is complete and, optionally, until erasure is complete.

Flexible support 38 can be any of a number of materials having suitable flexibility for mounting and scanning sections of imaging media. A number of different plastic sheet materials can be used, for example. Support 38 can be formulated or treated so that it is absorbent to the scanning beam wavelength in order to reduce the effects of any reflected or scattered light during scanning. An anti-reflection coating could be applied to front surface 40, for example. As a general guideline, it can be advantageous that the sheet material used for flexible support 38 have a flexural modulus of elasticity that is substantially equal to that of the phosphor imaging media, that is, to within about +/−20% or better. Flexible support 38 is itself re-usable in one embodiment; however, other embodiments provide a disposable flexible support 38 that attaches to or is held within frame 36 for single use. Still other embodiments provide the complete carrier 30 as a disposable item, for one-time use or for short-term use. One concern is to maintain sufficient surface adhesion or other retention force so that sections 32 are held against the surface of support 38 as it is transported through the scanner, including along the curved portions of the transport path P1-P1', yet allowing releasability, meaning that sections 32 can be released from the support 38 surface without excessive handling of imaged media sections 32. Using a renewable adhesive tape, for example, is one way to allow releasability and to allow later re-use of carrier 30.

Figure 5A:
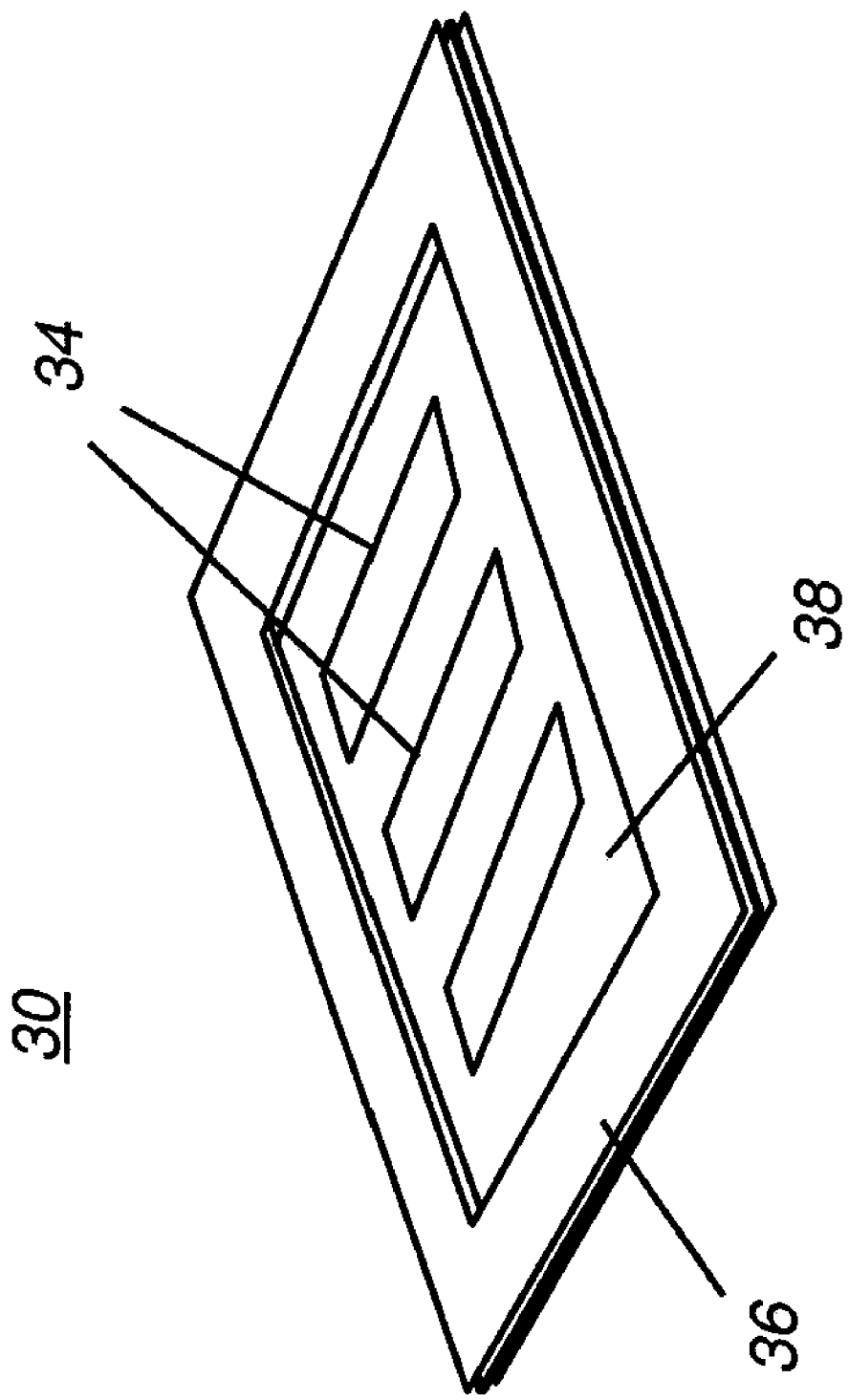
FIG. 5A shows a perspective view of a carrier according to one embodiment.
Figure 5B:
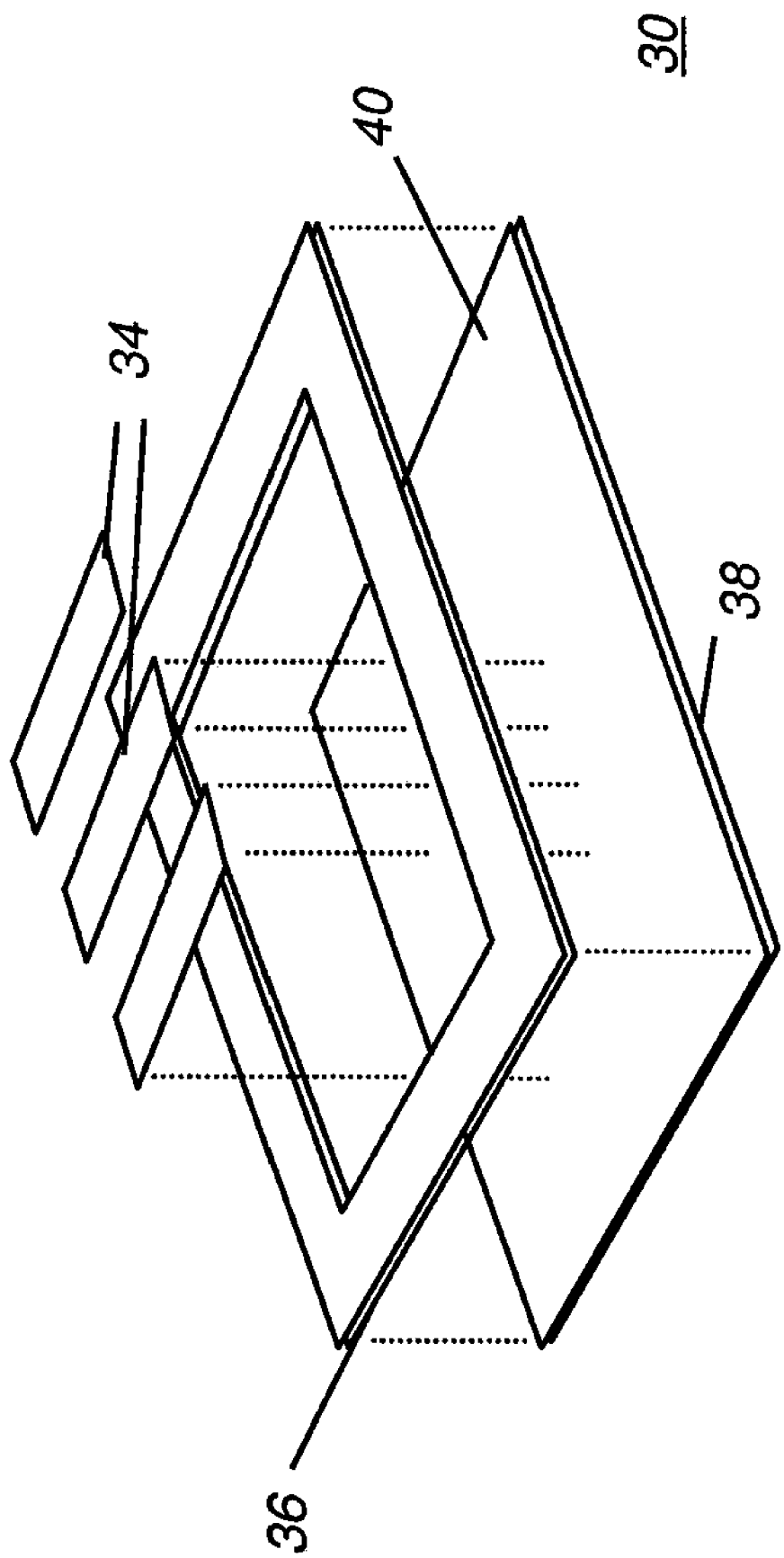
FIG. 5B shows an exploded view of the components of the carrier that was shown in FIG. 5A.

The perspective view of FIG. 5A and the exploded perspective view of FIG. 5B show how carrier 30 is formed in one embodiment. Flexible frame 36, extending at least partially along the perimeter of flexible support 38, can be glued or otherwise attached to support 38. Alternately, support 38 can be fitted into flexible frame 36. Frame 36 can also be releasably attached to support 38. The thickness of frame 36 is substantially the same as the thickness of any section 32 of flexible phosphor imaging material, to within 15% or less. The use of flexible frame 36, although optional, is advantaged for transport of carrier 30, providing a suitable gripping surface for rollers or other transport mechanism devices. Releasable retaining elements 34 may be formed within or added onto the surface of support 38.

Unlike conventional platen-based carriers that employ a rigid substrate for holding an item that is to be scanned, such as that described for a photograph in U.S. Pat. No. 5,285,237, for example, carrier 30 of the present invention is adapted to work with a scanner transport path that has some amount of curvature. Moreover, the low-profile design of carrier 30 enables its use in existing flexible sheet scanners, without requiring rework of transport path rollers or related devices. The design of carrier 30 allows images to be obtained from odd-sized sections of phosphor media, facilitating scanning for many types of NDT and other imaging functions.

Use of the apparatus and methods of the present invention adapts a sheet-fed scanner so that it is capable of handling one or more sections of odd-sized flexible imaging media without requiring extensive redesign or rework. Moreover, because its retaining element is releasable, odd-sized sections of the imaging media can be repeatedly re-used for imaging, undergoing a number of exposure/scan cycles. Referring back to FIG. 1, carrier 30 can be used where the transport path through scanner 10 is either straight (P2) or curved (P1, P1'). Carrier 30 is also compatible as a convenience for handling one or more odd-sized sections of flexible phosphor with flatbed scanner use.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10. Scanner
12. Transport apparatus
14. Laser
16. Beam
20. Detector
22. Erasure apparatus
28. Scanning head
30. Carrier
32. Section
34. Releasable retaining element
36. Frame
38. Support
40, 42. Surface
44. Cover sheet
P1, P1', P2. Transport path

What is claimed is:

1. A carrier for transporting a section of flexible phosphor imaging medium through a scanner, comprising:
   a flexible support having a front surface and a back surface;
   at least one releasable retaining element coupled to the flexible support for holding a first surface of the section of flexible phosphor imaging medium against the front surface of the flexible support; and
   a flexible frame extending at least partially along the perimeter of the flexible support and having a thickness above the front surface of the flexible support that is substantially the same as the thickness of the section of flexible phosphor imaging medium that is held against the front surface.

2. The carrier according to claim 1 wherein the at least one releasable retaining element comprises an adhesive.

3. The carrier according to claim 1 wherein the at least one releasable retaining element uses suction.

4. The carrier according to claim 1 wherein the at least one releasable retaining element at least partially covers the section of flexible phosphor imaging material.

5. The carrier according to claim 1 wherein the at least one releasable retaining element uses hook and loop fasteners.

6. The carrier according to claim 1 wherein the frame and the support are of the same material.

7. A method for obtaining an image from one or more exposed sections of a flexible phosphor imaging medium, comprising:
   a) providing a flexible support with a front surface having at least one releasable retaining element;
   b) retaining one or more exposed sections of the phosphor imaging medium with a non-phosphor surface of the phosphor imaging medium retained against the front surface of the flexible support;
   c) transporting the flexible support with one or more retained sections along a curved transport path and obtaining the image of each of the one or more retained sections of imaging medium;
   d) removing the one or more retained sections of the phosphor imaging medium from the front surface of the flexible support; and
   e) reusing the flexible support by retaining one or more additional sections of flexible phosphor imaging media and repeating steps b) and c) for obtaining an image from one or more additional sections of flexible phosphor imaging media.

8. The method of claim 7 further comprising erasing the one or more retained sections of the phosphor imaging medium prior to removal from the surface of the flexible support.

9. The method of claim 7 wherein retaining the one or more exposed sections of the phosphor imaging medium uses an adhesive.

10. The method of claim 7 wherein retaining the one or more exposed sections of the phosphor imaging medium uses hook and loop fasteners.

11. The method of claim 7 wherein retaining the one or more exposed sections of the phosphor imaging medium comprises overlaying a releasable retaining element onto the one or more exposed sections.

12. A method for obtaining an image from one or more exposed sections of a flexible phosphor imaging medium comprising:
   retaining the one or more exposed sections of the phosphor imaging medium against a front surface of a flexible support having at least one releasable retaining element;
   transporting the flexible support with one or more retained sections along a transport path and obtaining the image of each of the one or more retained sections of imaging medium;
   transporting the flexible support with one or more retained sections along the transport path and erasing the image of each of the one or more retained sections of imaging medium; and
   removing the one or more retained erased sections of the phosphor imaging medium from the front surface of the flexible support.

13. The method of claim 12 wherein obtaining the image comprises transporting the flexible support in a forward direction along the transport path and erasing the image comprises transporting the flexible support in a reverse direction.

14. The method of claim 12 wherein retaining the one or more exposed sections of the phosphor imaging medium uses an adhesive.

15. The method of claim 12 wherein retaining the one or more exposed sections of the phosphor imaging medium uses hook and loop fasteners.

16. The method of claim 12 wherein retaining the one or more exposed sections of the phosphor imaging medium comprises overlaying a releasable retaining element onto the one or more exposed sections.

* * * * *